United States Patent [19]

Switzer

[11] Patent Number: 4,521,499

[45] Date of Patent: Jun. 4, 1985

[54] HIGHLY CONDUCTIVE PHOTOELECTROCHEMICAL ELECTRODES AND USES THEREOF

[75] Inventor: Jay A. Switzer, Placentia, Calif.

[73] Assignee: Union Oil Company of California, Los Angeles, Calif.

[21] Appl. No.: 496,284

[22] Filed: May 19, 1983

[51] Int. Cl.$^3$ .................. H01M 6/36; C25B 1/02; C25B 3/00

[52] U.S. Cl. .................. 429/111; 204/59 R; 204/72; 204/78; 204/128; 204/129; 204/242; 204/290 R; 204/DIG. 3

[58] Field of Search .................. 204/59 R, 72–81, 204/128, 129, 242, 290 R, DIG. 3; 429/111

[56] References Cited

U.S. PATENT DOCUMENTS

| 4,011,149 | 5/1978 | Nozik | 204/129 |
|---|---|---|---|
| 4,090,933 | 3/1977 | Nozik | 204/129 |
| 4,196,263 | 4/1980 | Shay et al. | 429/111 |
| 4,315,973 | 2/1982 | Manassen et al. | 429/111 |
| 4,427,749 | 1/1984 | Graetzel et al. | 429/111 |
| 4,438,183 | 3/1984 | Baughman et al. | 429/111 |

OTHER PUBLICATIONS

J. F. McCann et al, "Photoelectrochemical Properties of n-type $In_2O_3$", *J. Electrochem. Soc.*, vol. 128, pp. 1719–1723 (1981).
K. Rajeshwar et al, "Novel Concepts in Photoelectrochemical Cells", Abstracts of Presentation, 4th Electrochemical Photovoltaic Cell Contractor's Review Meeting, Denver, Colorado, Oct. 16–17, 1981, pp. 136–139.
M. Tomkiewicz et al, *Appl. Phys.*, vol. 18 (1979), p. 23.
K. Rajeshwar et al, *Electrochimica Acta*, vol. 23 (1978), p. 1130.
H. P. Maruska et al, *Solar Energy Mat'ls*, vol. 1 (1979), pp. 411–416.
W. Gissler et al, *J. Electrochem. Soc.*, vol. 129 (1982), pp. 1733–1738.
D. S. Ginley et al, "BP-Stabilized n-Si and n-GaAs Photoanodes", *J. Electrochem. Soc.*, vol. 130, pp. 1999–2002 (1983).
H. Morisaki et al, *Japanese J. Appl. Phys.*, vol. 19, pp. L148–L150 (1980).
W. E. Pinson, *Appl. Phys. Lett.*, vol. 40, pp. 970–972 (1982).

G. Nogami et al, *J. Appl. Phys.*, vol. 54, pp. 1605–1609 (Mar. 1983).
R. R. Potter et al, *J. Appl. Phys.*, vol. 53, pp. 5269–5272 (1982).
Y. Nakato, K. Abe, and H. Tsubomura, *Ber. Bunsenges Phys. Chem.*, 80, 1002 (1976).
A. Heller, E. Aharon-Shelom, W. A. Bonner, and B. Miller, *J. Am. Chem. Soc.*, 104, 6942 (1982).
S. Wagner and J. Shay, *Appl. Phys. Lett.*, 31, 446 (1977).
L. Thompson, J. DuBow, and K. Rajeshwar, *J. Electrochem. Soc.*, 129, 1934 (1982).
R. Noufi, A. J. Frank, and A. J. Nozik, *J. Am. Chem. Soc.*, 103, 1849, (1981).
T. Skotheim, I. Lundstrom, and J. Prejza, *J. Electrochem. Soc.*, 128, 1625 (1981).
F. R. F. Fan, B. L. Wheeler, A. J. Bard, and R. N. Nuofi, *J. Electrochem. Soc.*, 128, 2042 (1981).
F. R. F. Fan, R. G. Keil, and A. J. Bard, *J. Am. Chem. Soc.*, 105, 220 (1983).
F. R. F. Fan, G. Hope, and A. J. Bard, *J. Electrochem. Soc.*, 129, 1647 (1982).
A. B. Bocarsly, E. G. Walton, and M. S. Wrighton, *J. Am. Chem. Soc.*, 102, 3390 (1980).
J. A. Switzer, E. L. Moorehead, and D. M. Dalesandro, *J. Electrochem. Soc.*, 129, 2232 (1982).
H. P. Geserich, *Phys. Stat. Sol.*, 25, 741 (1968).
V. N. Shukla and G. P. Wirtz, *J. Amer. Ceramic Soc.*, 60, 253; 259 (1977).
G. P. Wirtz, C. J. Yu, and R. W. Doser, *J. Amer. Ceramic Soc.*, 64, 269 (1981).
A. J. Bard, *Science*, 207, 139 (1980).
A. Heller, *Acc. Chem. Res.*, 14, 154 (1981).
M. S. Wrighton, *Acc. Chem. Res.*, 12, 303 (1979).
A. J. Bard, *J. Phys. Chem.*, 86, 172 (1982).
G. Hodes, L. Thompson, J. DuBow, and K. Rajeshwar, *J. Am. Chem. Soc.*, vol. 105, 324 (1983).

*Primary Examiner*—Aaron Weisstuch
*Attorney, Agent, or Firm*—Dean Sandford; Gregory F. Wirzbicki; Alan H. Thompson

[57] ABSTRACT

A photoelectrode, containing a highly conductive coating material having a band gap greater than 0 to about 3.0 e.V. on a substrate containing a semiconductor material, is utilized in photovoltaic cells, photoelectrosynthesis and photoelectrocatalysis.

63 Claims, No Drawings

HIGHLY CONDUCTIVE PHOTOELECTROCHEMICAL ELECTRODES AND USES THEREOF

BACKGROUND OF THE INVENTION

1. Field of the Invention

The invention relates to photoelectrochemical electrodes and, more particularly, to the utilization of photoelectrochemical electrodes for producing electricity from semiconductor liquid junction photovoltaic cells and for producing stored energy products from photoelectrosynthetic and photoelectrocatalytic cells.

2. Description of the Prior Art

Three photoelectrochemical cells that have recently received considerable attention are photovoltaic semiconductor liquid junction cells, photoelectrosynthesis and photoelectrocatalysis. Such cells utilize photoelectrodes to convert energy from light, usually solar energy, into other forms, such as electrical or chemical energy. Typically, solid semiconductor photoelectrodes are employed to facilitate the conversion. These solid materials, according to the band theory of solids, contain atoms whose discrete electronic energy states have merged into energy bands of allowed energies for electrons. The energy required to excite electrons in such solid materials from a maximum energy in the valence band to a minimum energy in the conduction band represents the band gap energy. At approximately room temperature, valence and conduction energy bands of conductors such as metallic solids are not separated, i.e. they have a band gap of about 0. Furthermore, the valence and conduction bands of semiconductor solid materials are typically separated by a band gap of above 0 to less than about 4.0 e.V., while higher values are associated with insulator materials.

The most efficient utilization of terrestrial solar energy by semiconductor materials has been observed to occur with the absorption of photons associated with near-infrared light. Light-absorbing semiconductor materials having a band gap of approximately 1.4 e.V. tend to maximize the efficiencies of the conversion from solar to other forms of energy. In photoelectrosynthesis, photoelectrocatalysis and photovoltaic liquid junction cells, electron-hole pairs are generated by the absorption of light in either semiconductor photoanodes, semiconductor photocathodes or both. The electron and the hole of electron-hole pairs are separated at a semiconductor-liquid junction and are injected at the respective electrodes to produce electrochemical oxidation and reduction reactions. Ordinarily, holes move to the surface at n-type semiconductors and induce oxidation reactions while electrons move to the surface at p-type semiconductors and cause reduction reactions.

One of the problems with photocatalytic electrodes containing semiconductor materials is stability. Photogenerated holes at an n-liquid interface and photogenerated electrons at a p-liquid interface are often capable of respectively oxidizing and reducing the semiconductor material themselves. Such a stability problem appears more acute with n-type materials where the photogenerated holes at the n-liquid interface are capable of oxidizing the semiconductor.

A number of approaches have been taken to stabilize semiconductors. In one approach, by proper choice of a redox-couple, the photogenerated holes may be removed rapidly before decomposition can occur. Other approaches involve changing from an aqueous liquid to a non-aqueous one or modifying the semiconductor surfaces. Another approach includes putting a coating material, such as a highly conductive metal like platinum, or a semiconductor having a wide band gap (i.e. $>3.0$ e.V.), such as $SnO_2$, or a polymer such as polypyrrole, on a photoelectrode surface. However, the search continues for coating materials that impart stability to semiconductor-containing photoelectrodes employed in highly efficient photovoltaic and photoelectrochemical cells.

Accordingly, it is an object of the present invention to provide a photoelectrode that is highly stable, especially when utilized in photoelectrochemical cells.

Another object of the invention is to provide a coating material for a semiconductor-containing photoelectrode that improves the efficiency of a photoelectrochemical cell.

Yet another object still is to provide a method for producing a highly stable photoelectrode that may be employed in a photovoltaic, photoelectrosynthetic or photoelectrocatalytic cell.

A further object of the invention is to provide a photoelectrochemical cell employing a novel photocatalytic electrode.

These and other objects and advantages of the invention will become apparent from the following description.

SUMMARY OF THE INVENTION

Briefly, the present invention is directed to a photoelectrode, its method of preparation and a process employing such an electrode for the conversion of energy, especially solar terrestrial energy, into other forms such as electricity or chemical products. Photoelectrodes of the invention are useful in semiconductor liquid junction photovoltaic cells, photoelectrosynthetic cells and photoelectrocatalytic cells. In one embodiment, a photoelectrode containing a highly conductive coating material having a band gap from greater than 0 to about 3.0 e.V. on a substrate is employed to convert light energy to either electrical or chemical energy. In a preferred embodiment, a photoelectrode having a coating material containing thallium (III) oxide on a silicon-containing semiconductor is useful in a semiconductor liquid junction photovoltaic cell.

DETAILED DESCRIPTION OF THE INVENTION

The invention is directed to a photoelectrode containing a highly conductive coating material having a band gap greater than 0 to about 3.0 e.V. on a substrate, and preferably to photoelectrodes containing thallium (III) oxide on a substrate containing a semiconductor. The electrode of the invention is particularly well suited for use as a photoanode in a semiconductor liquid junction photovoltaic cell.

The photoelectrode of the invention is typically employed at the anode of a photovoltaic cell and a counter electrode such as platinum metal is employed at the cathode, although the counter electrode may also be a photoelectrode of the invention. The electrodes of the cell are immersed in a liquid containing an electrolyte and at least one redox-couple. (The liquid and/or electrolyte may also serve as at least a portion of the redox-couple.) In operation, light irradiates the photoanode of the invention, usually after passing through at least a portion of the liquid surrounding the photoanode. The irradiation results in the generation of a photoelectric current from the photoanode to an external circuit.

Whatever the form of energy to which the light is converted, the substrate material of the electrode must be capable of generating electron-hole pairs. Substrates useful in the present electrodes include materials containing at least one semiconductor. Ordinarily, the substrate is in the form of a single crystalline, polycrystalline, or amorphous structure, or combinations thereof. Such materials usually have a band gap from greater than 0 to about 4.0 electron volts (e.V.). Preferably, the substrate comprises at least one semiconductor having a band gap from about 0.5 to about 4.0 e.V., preferably about 0.5 to about 3.0 e.V., more preferably from about 0.7 to about 2.5 e.V. and most preferably from about 1.0 to about 1.8 e.V. Oftentimes, two or more semiconductor materials are combined together in various proportions or layers resulting in a final substrate having a desired band gap within the above-mentioned ranges. The semiconductor material contained in the substrate may be either intrinsic materials or suitably doped n-type or p-type materials, but preferably not those doped to degeneracy.

Semiconductor materials of the invention preferably contain (1) elemental semiconductors such as selenium, silicon and germanium, (2) the binary group semiconductors such as Group III–V semiconductors including, for example, GaAs, InP, GaP and AlSb, (3) the Group II–VI semiconductors including, for example, CdS, CdSe and CdTe, (4) the metal-containing chalcogenides, particularly those containing transition metals such as the selenides, tellurides and sulfides of tungsten and molybdenum, or (5) the Group I–III–VI ternary semiconductors such as $CuInS_2$, $CuInSe_2$ and $CuInTe_2$. The most highly preferred semiconductor materials of the present invention may be selected from the group consisting of silicon, GaAs, InP, CdSe and GaP, especially n-type semiconductor materials thereof.

The photoelectrode of the invention contains a highly conductive coating material. Preferably, the coating material comprises at least a portion of the outermost layer on the electrode. The coating material is preferably an inorganic semiconductor material, including metal-containing semiconductor materials such as thallium (III) oxide ($Tl_2O_3$), cadmium oxide (CdO), bismuth oxide ($Bi_2O_3$), lead dioxide ($PbO_2$), cuprous oxide ($Cu_2O$), chromium oxide ($Cr_2O_3$), silver oxide ($Ag_2O$), delafossite-type oxides such as $PtCoO_2$, $PdCoO_2$, $PdRhO_2$ and $PdCrO_2$, as well as ruthenium sulfide ($RuS_2$) and cuprous sulfide ($Cu_2S$). The most highly preferred coating material contains thallium (III) oxide.

Coating materials typically have a band gap from greater than 0 to about 3.0 e.V., usually from about 0.5 to about 3.0 e.V., and preferably about 0.5 to about 2.35 e.V. A partial list of band gaps of coating materials useful in the invention are the elemental and/or binary compounds disclosed in W. H. Strehlow and E. L. Cook's *Compilation of Energy Band Gaps in Elemental and Binary Compound Semiconductors and Insulators*, J. Phys. Chem. Ref. Data, Vol. 2, No. 1, 1973, which is herein incorporated by reference. As used herein, the band gap energy represented in electron volts (e.V.) is understood to be the energy required to excite electrons in solid materials from a maximum energy in the valence band to a minimum energy in the conduction band and may be measured by conventional techniques such as absorption, reflection or photocurrent action spectroscopy at approximately room temperature, i.e. from about 25° C. to about 30° C.

In addition to having a band gap in the previously-mentioned range, the coating material required in the invention should be sufficiently transparent to allow a substantial portion of the light energy to be transmitted to and utilized by the substrate material during its use in a cell. The band gap of the coating material is preferably at least as high as, and more preferably higher than, the band gap of the substrate. Ordinarily, the transparency of the coating material is enhanced by employing a thin layer of the coating material with the substrate. Although only a relatively thin layer of the coating material is needed, the substrate may be coated with a layer thicker than about $10^5$ angstroms; however, the substrate should be coated with a thin layer that is preferably less than about $10^5$ angstroms, more preferably less than about $10^4$ angstroms and most preferably less than about $2 \times 10^3$ angstroms.

An unusual feature of the coating material used in the invention is its high conductivity. The conductivity of the coating material is typically greater than that of the substrate material. In general, the conductivity must be sufficient to allow a substantial number of electrons or holes from the photogenerated electron-hole pairs of the substrate to be transported to the surface of the photoelectrode or toward the bulk of the substrate, as manifested by a series resistance less than about 1000 ohms, and preferably less than 100 ohms, during operation of a photoelectrochemical cell. Although its band gap is greater than 0, the resistivity of the coating material, as a measure of its conductivity, is generally less than about $10^{-2}$ ohm-cm, preferably less than about $10^{-3}$ ohm-cm, most preferably less than about $10^{-4}$ ohm-cm.

In contrast to the substrate material, it is preferred that the coating material be essentially either naturally degenerate or doped to degeneracy extrinsically. Degeneracy, as used herein, is the condition of a material wherein its Fermi energy level is at least, and preferably greater than that of the minimum energy of its conduction band for an n-type material or, in the case of p-type materials, the Fermi level is at most, and preferably less than, that of the maximum energy of its valence band.

An additional feature of the coating material useful in the invention is its catalytic property for promoting chemical reactions, especially oxidation or reduction reactions associated with a selected redox-couple employed in a photoelectrochemical cell. When contacted with a redox-couple in a liquid, substrates utilized in the invention, without a coating material as required in the invention, provide a relatively small or essentially no significant catalytic effect upon such oxidation or reduction reactions. When a coating material of the invention is present on the substrate, the catalytic properties of the photoelectrode of the invention are substantially increased, as evidenced by the efficiencies of the energy conversion reactions associated with the selected redox-couples being increased, usually by at least 10, preferably by at least 100 and most preferably by at least 500 times that of a comparative but uncoated electrode. Due to such catalytic properties, a photoelectrode of the invention may also be termed a "photocatalytic electrode." When the photoelectrode of the invention is employed in an electrochemical cell wherein the desired oxidation-reduction reactions of the cell have been known to be promoted with catalytic materials other than the coating material of the invention, such materials may be combined with the coating material required in the invention to further improve the efficiency of the cell.

Also, during operation of a cell employing a photoelectrode having an uncoated substrate, layers of insulating materials may form on the surface of the uncoated substrate. Such layers contribute to substantial reduction in the stability of the photoelectrode and/or in the efficiency of the desired reaction in the cell. However, in the photoelectrode of the invention, the coating material contacts and at least, in part, covers such layers of the insulator material. The insulator material contained in the photoelectrode of the invention, whether intentionally or unintentionally formed on the substrate, usually has an average thickness less than about 100 angstroms, preferably less than 50 angstroms and most preferably from about one to about 20 angstroms, as measured by ellipsometry and conventional surface spectroscopy techniques as, for example, the Auger depth profiling technique. Such a material typically has a band gap greater than about 3.0 e.V., and preferably greater than 4.0 e.V.

An example of the effects of the coating material over insulating materials is demonstrated when the surface of an uncoated n-type silicon-containing substrate is oxidized in contact with air, oxygen or another oxidizing agent from a redox-couple so as to produce a thin layer of an oxide of silicon such as silicon dioxide having a band gap greater than 4.0 e.V. Although the silicon dioxide-coated, n-type silicon substrate employed in a photoelectrochemical cell provides relatively low efficiencies for energy conversion processes, a coating material, such as thallium (III) oxide, covering the silicon dioxide layer, produces a cell having unusually high efficiencies, especially as compared to the same photoelectrode, but containing no coating material.

Coating materials useful in the invention must be stable electrochemically and inert to undesired reactions with the liquid portion of the photoelectrochemical cell. Such undesired reactions include oxidation or reduction reactions with an electrolyte, the liquid itself, or any reactant or product of the desired energy conversion reaction. When the liquid or the electrolyte comprises part of the selected redox-couple in the desired energy conversion reaction, the inert property of the coating material also pertains to other undesirable reactions in the cell. Due to the stability properties, the coating material serves to protect the photoelectrode by, inter alia, inhibiting the degradation or photodegradation of the substrate material.

The stability of the photoelectrode of the invention as compared to photoelectrodes not containing the coating material of the invention may be determined by the rate of decay of the short-circuit photocurrent in photoelectrochemical cells. The rate of decay of a photoelectrode may be defined herein in terms of its halflife. The halflife of a photoelectrode, as used herein, is the time for the initial photocurrent generated in a photoelectrochemical cell employing the given photoelectrode to decrease to one-half that photocurrent value. In general, the halflife of the photoelectrode of the invention employed in cells is greater, ordinarily at least 10 times greater, preferably at least $10^3$ times greater and most preferably at least $10^4$ times greater than the halflife of the same photoelectrode but not containing the coating material required in the invention operating in an otherwise identical cell.

To prepare the photoelectrode, the substrate is compounded with the coating material. The compounding may be accomplished by conventional techniques including vacuum evaporation, sputtering, chemical vapor deposition (CVD), spray pyrolysis and mechanical methods such as brushing, spraying and impregnation. It is preferred to compound the coating material with polished and/or etched substrate materials. Ordinarily, the substrate portion of the electrode forms an ohmic contact with conductive materials and together with other conducting means, such as a conducting wire, the electrode may conveniently be constructed with other components of an electrochemical cell.

Coating materials of the invention, such as thallium (III) oxide, may also be compounded with the substrate by an electrochemical or a photo-assisted electrochemical deposition technique. In the electrochemical deposition technique, the coating material is deposited on the surface of a substrate employed as an anode or cathode in an electrochemical cell that contains a redox-couple comprising coating material precursors. The electrochemical cell is preferably biased with electrical energy from an external source, and furthermore, the thickness of the coating material on the substrate may conveniently be controlled by monitoring the current such as by measuring the coulombs per unit area passed through the cell. Control of the thickness of a particular coating material relative to the coulombs passed through the cell is dependent upon such factors as cell stoichiometry, current density and density of the coating material. A galvanostatic anodization technique may be utilized wherein a constant photocurrent is employed in the cell while variation in the voltage occurs during deposition. Substrates containing p-type semiconductors are usually employed as anodes and those containing n-type semiconductors as cathodes.

The electrochemical deposition of a coating material on the substrate is preferably photo-assisted. In this photoelectrochemical deposition technique, the substrate, employed as an anode or cathode or both, absorbs light during the operation of the cell, and the coating material is deposited on the substrate from a redox-couple containing the coating material precursor. Ordinarily, the cell is biased, and in this case, substrates containing n-type semiconductors are employed as anodes and p-type semiconductors as cathodes.

An unusual feature of the invention is a photo-assisted potentiostatic deposition technique for depositing the coating material onto the semiconductor-containing substrate, especially in the preparation of relatively thin films of the coating material on the photoelectrode. In such a technique, a constant voltage is employed in the cell while the current tends to pass through a maximum range of values during the time of cell operation. The average thickness of the coating material of the invention is preferably optimized when the deposition process is stopped at such time that the photocurrent approaches within 20 percent of, and preferably reaches, its maximum value. Such a technique results in highly uniform layers of the coating material on the semiconductor-containing substrate, and the photoelectrode prepared therefrom exhibits greater stability in a more efficient photoelectrochemical cell than photoelectrodes prepared by galvanostatic anodization techniques. It is believed that high uniformity is due to the deposition rate being fastest where the film is thinnest.

Although biasing of the electrochemical cell during production of the photoelectrodes of the invention is usually done with an external source of electrical energy to the cell, an internal source of energy may serve to replace all or part of the electrical biasing. Such a variation is the electroless deposition process wherein electrical biasing is replaced by the energy generated from the oxidation and/or reduction of a selected redox-couple. The electroless deposition process is preferably photo-assisted. Furthermore, the electroless deposition technique may be utilized to deposit any coating material having a band gap less than about 4.0 e.V., preferably highly conductive coating materials, onto any substrates, disclosed hereinbefore, having band gaps from greater than 0 to about 4.0 e.V. For example, a photoelectroless deposition of a metal coating material on a semiconductor may be employed to prepare an electrode, preferably a photoelectrode, that may be utilized in any electrochemical cell, especially photoelectrochemical cells.

In a highly preferred embodiment for preparing a photoelectrode of the invention, a thallium (III) oxide-containing coating material is electrochemically deposited on an n-type silicon semiconductor substrate at the anode of the electrochemical cell. During operation, such a cell is preferably electrically biased, and light is directed toward the n-type silicon anode while a thallium (I) ion-containing solution is oxidized to thallium (III)-containing components on the silicon surface. The galvanostatic anodization technique is preferred, and the potentiostatic anodization deposition technique is most highly preferred, especially for relatively thin films of thallium (III) oxide such as films less than about 2000 angstroms thick.

The photoelectrodes prepared in accordance with the invention are employed under conditions suited for their intended purposes, as for example, in a photoelectrochemical process for generating electricity, or in a photoelectrochemical process for promoting the production of chemical products in either exoergic or endoergic reactions. As heretofore mentioned, when employed to promote the generation of electricity, the photoelectrode may be used as an anode, cathode or both, in contact with a liquid containing a redox-couple, i.e. a photoelectrode liquid junction photovoltaic cell.

The photoelectrode of the invention effectively utilizes the available light during operation of such a cell. The efficiency of a photovoltaic cell employing the photoelectrode of the invention is substantially greater than that of a cell employing the same electrode but without the coating material required in the invention. In general, the efficiency of a cell, as used hereinafter, is determined by the ratio of the power output to the power input. In a photoelectrochemical cell, the power input is typically the photons of light irradiating the photoelectrode while the power output depends upon the nature of the cell product, i.e. electricity, or chemical products resulting from exoergic and endoergic reactions. As used herein, the percent efficiency of a photovoltaic cell may be defined according to the following equation:

$$\text{Efficiency (percent)} = \frac{j_{sc} \times V_{oc} \times f\!f \times 100}{P}$$

wherein $j_{sc}$ is the short-circuit photocurrent density usually measured in mA/cm$^2$, wherein $V_{oc}$ is the open-circuit photovoltage V, wherein P is the irradiance usually measured in mW/cm$^2$ and wherein ff is the fill factor usually measured as the ratio of the product of the cell voltage and the photocurrent density at the maximum power point $(V_{max} \times j_{max})$ to $(V_{oc} \times j_{sc})$, i.e.

$$f\!f = \frac{(V_{max} \times j_{max})}{(V_{oc} \times j_{sc})}.$$

The photoelectrode may also be employed as an anode, cathode or both, in a photoelectrosynthetic cell wherein the chemical products result from an endoergic reaction. In a photoelectrosynthetic cell, the photoelectrode of the invention may be employed to generate chemical products of higher free energy than that of the reactant materials. In one embodiment, light irradiates a photoanode of the invention containing an n-type semiconductor and a counter electrode containing platinum serving as a cathode immersed in a liquid redox-couple such as water. Higher energy products such as hydrogen and oxygen gases are generated from the water at the respective electrodes. Although the redox reaction typically requires an external bias potential, efficiencies of photoelectrosynthetic conversion reactions in cells employing photoelectrodes of the invention are at least greater, preferably at least 100 times, and most preferably at least 1000 times greater than that of those cells employing the same photoelectrodes, but uncoated. Such an efficiency of a photoelectrosynthetic cell, as used herein, may be determined from the above-described photovoltaic efficiency equation, except the open-circuit photovoltage $V_{oc}$ is replaced by $(E° - V_{bias})$ wherein $E°$ is the thermodynamic potential of the overall photoelectrosynthetic cell reaction, i.e. cell voltage, and $V_{bias}$ is the minimum voltage required to observe the onset of cell photocurrent. In a water-splitting cell employing photoelectrodes of the invention, especially those containing thallium (III) oxide on n-type silicon substrates, the efficiency is greater than that of cells with uncoated comparable photoelectrodes.

Photoelectrosynthetic cells employing the photoelectrode of the invention may convert essentially any organic reactant in the presence of water to an oxidized organic product and hydrogen. Other examples of typical photoelectrosynthetic conversion reactions employing the photoelectrode of the invention include hydrogen chloride converted to hydrogen and chlorine, hydrogen bromide converted to hydrogen and bromine, hydrogen iodide converted to hydrogen and iodine, water and propylene converted to propylene oxide and hydrogen, and water and carbon dioxide converted to methanol and oxygen.

In a photoelectrocatalytic cell employing the photoelectrode of the invention, the chemical products result from an exoergic reaction and often the cell allows a more economic preparation of some useful chemical products. For example, a photoelectrocatalytic cell converting propylene and oxygen to the highly useful chemical product, propylene oxide (and water), is made more economically feasible employing a photoelectrode of the invention. In general, a photoelectrocatalytic conversion reaction involving oxygen with essentially any oxidizable organic material or molecule converted to the oxidized organic product (and water) may be promoted with a photoelectrode of the invention in a photoelectrocatalytic cell.

The invention is further illustrated by the following examples which are illustrative of specific modes of practicing the invention and are not intended as limiting the scope of the invention defined by the appended claims.

EXAMPLE I

Photoelectrodes A, B, C, E and F of the invention are prepared by photoelectrochemical deposition, and Photoelectrode D of the invention by photoelectroless deposition as follows:

Photoelectrode A

An ohmic contact is formed with gallium/indium (50%/50%) solder on the back of a polished and etched silicon substrate material that contains n-type crystals doped with phosphorus to a volume resistivity of 0.2–2.0 ohm-cm. A copper wire is attached to the ohmic contact with conducting silver epoxy and sealed in a glass tube with insulating epoxy and silicone sealant.

The electrode is placed in an alkaline (1.0 M NaOH) solution of 0.5 M thallium (I) acetate and electrolyzed at a constant anodic current density (i.e. galvanostatic anodization) of 30 mA/cm$^2$ under intense Xenon irradiation (156 mW/cm$^2$). A digital coulometer is used to control the thin uniform layer of thallium (III) oxide coating material deposited on the n-type silicon to an average thickness of approximately 46,000 angstroms.

Photoelectrode B

The photoelectrode is prepared in a similar manner to that of Photoelectrode A, except thallium (III) oxide is coated to an average thickness of approximately 2000 Å.

Photoelectrode C

A photoelectrode is prepared in a similar manner to that of Photoelectrode A, except the silicon is electrolyzed at a constant potential (i.e. potentiostatic anodization) of 0.0 V vs. SCE (Saturated Calomel Electrode), and irradiated at 111 mW/cm$^2$ (Xenon irradiation) while the anodic current density increases to a maximum. The deposition is stopped when the thallium (III) oxide has an average thickness of about 700 angstroms.

Photoelectrode D

A photoelectrode is prepared by a photo-assisted electroless technique. In a similar procedure to that of Photoelectrode A, n-type silicon is etched, an ohmic contact is formed, copper wire is attached and sealed in a glass tube and placed in a solution for deposition of thallium (III) oxide coating material. The electrode is placed in an alkaline (adjusted to pH 10 with ammonium hydroxide) solution having a concentration of 50 mM thallium (I) acetate, 100 mM ammonium persulfate and 1 M ammonium acetate, and irradiated with 175 mW/cm$^2$ Xenon light for about three hours. The solution turns brown and the thallium (III) oxide coating material is deposited on the n-type silicon.

Photoelectrode E

A photoelectrode is prepared in a similar manner to that of Photoelectrode A, except semiconductor substrate materials are n-type single crystals of cadmium sulfide (CdS). A 2000 angstrom thick layer of thallium (III) oxide coating material is deposited on the n-CdS when the crystals are electrolyzed at a current density of 0.8 mA/cm$^2$ and irradiated with 175 mW/cm$^2$ Xenon light.

Photoelectrode F

A photoelectrode is prepared in a similar manner to that of Photoelectrode A, except the semiconductor substrate is molybdenum sulfide (MoS$_2$). Thallium (III) oxide coating material is deposited on the MoS$_2$ when the MoS$_2$ is electrolyzed at a current density of 10 mA/cm$^2$ and irradiated with 175 mW/cm$^2$ Xenon light.

EXAMPLE II

Eleven regenerative liquid junction photovoltaic cells are constructed with Photoelectrodes A through F of Example I, inclusive, and with comparative "n-type silicon" and "molybdenum disulfide (MoS$_2$)" electrodes, each comparative electrode not containing a thallium (III) oxide coating material. Each cell employs the photoelectrode of the invention as a photoanode, while a platinum counter electrode is employed at the cathode. Also, the electrodes are immersed in an alkaline solution (1.0 M NaOH) of 0.1 M/0.1 M ferrocyanide/ferricyanide [Fe(CN)$_6^{-4}$/Fe(CN)$_6^{-3}$].

During operation of each cell, ferrocyanide is oxidized at the irradiated photoanode, and ferricyanide is reduced at the dark platinum counter electrode. The observed photovoltaic characteristics, including efficiencies, are summarized in Table I.

TABLE I

| | | Photovoltaic Characteristics of Photoanodes | | | |
|---|---|---|---|---|---|
| Cell | Photoanode | Xenon Irradiance (mW/cm$^2$) | Open-Circuit Photovoltage (V) | Short-Circuit Photocurrent Density (mA/cm$^2$) | Fill Factor | Photovoltaic Efficiency (%) |
| 1 | n-type Si | 109.1 | 0.240 | 0.0227 | 0.205 | 0.00102 |
| 2 | n-type Si | 13.9 | 0.210 | 0.0147 | 0.194 | 0.0043 |
| 3 | A (Tl$_2$O$_3$/n-Si) | 175 | 0.404 | 7.68 | 0.493 | 0.87 |
| 4 | B (Tl$_2$O$_3$/n-Si) | 156 | 0.465 | 44.5 | 0.440 | 5.84 |
| 5 | B (Tl$_2$O$_3$/n-Si) | 78 | 0.470 | 28.8 | 0.540 | 9.37 |
| 6 | B (Tl$_2$O$_3$/n-Si) | 16 | 0.450 | 6.83 | 0.631 | 12.1 |
| 7 | C (Tl$_2$O$_3$/n-Si) | 15.1 | 0.435 | 7.67 | 0.660 | 14.6 |
| 8 | D (Tl$_2$O$_3$/n-Si) | 110 | 0.366 | 17.4 | 0.300 | 1.74 |
| 9 | E (n-CdS) | 150 | 0.430 | 1.25 | 0.672 | 0.241 |
| 10 | MoS$_2$ | 1900 | 0.046 | 0.030 | 0.250 | $1.8 \times 10^{-5}$ |
| 11 | F (Tl$_2$O$_3$/MoS$_2$) | 1900 | 0.076 | 0.250 | 0.25 | $2.5 \times 10^{-4}$ |

At approximately the same irradiance of the photoanode, cells 6 and 7, employing photoanodes B and C (silicon substrates) of the invention, exhibit photovoltaic efficiencies that are respectively about 2,800 and 3,400 times greater than that of the uncoated silicon photoanode in cell 2. Additionally, cell 11, containing Photoanode F (MoS$_2$ substrate) of the invention, exhibits greater than 10 times the efficiency of cell 10 containing the uncoated comparative photoanode. Although lower light intensities tend to produce cells of higher efficiencies, cells 3, 4, 5, 6, 7 and 8, each containing a photoanode of the invention, all exhibit higher efficiencies than cells 1 and 2 containing the uncoated comparative photoanodes irradiated at their respective high and low intensities.

irradiates the photoanode. After operation for approximately one-half hour, the observed photoelectrosynthetic cell characteristics, including efficiencies, are summarized in Table III.

TABLE III

| | Photoelectrochemical Water-Splitting Efficiencies | | | | |
|---|---|---|---|---|---|
| Cell Number | Photoanode | Irradiance Light Intensity (mW/cm$^2$) | Open-Circuit Photovoltage (V) | Short-Circuit Photocurrent Density (mA/cm$^2$) | Fill Factor | Efficiency (%) |
| 12 | n-type Si | 15 | 0.71 | 0.00050 | 0.16 | $3.7 \times 10^{-4}$ |
| 13 | n-type Si | 115 | 0.89 | 0.0018 | 0.11 | $1.5 \times 10^{-4}$ |
| 14 | B | 115 | 0.16 | 3.6 | 0.11 | $5.2 \times 10^{-2}$ |
| 15 | G | 115 | 0.21 | 16 | 0.14 | 0.39 |
| 16 | G | 15 | 0.16 | 4.2 | 0.19 | 0.82 |

EXAMPLE III

Photoelectrodes A, B and C and the uncoated comparable silicon electrode of Example I are tested for stability in the photoelectrochemical cell of Example II. However, the four photoelectrodes are irradiated with 86 mW/cm$^2$ Xenon light that has passed through a long pass filter so that the ferrocyanide/ferricyanide redox-couple is not photolyzed, i.e. essentially no light is absorbed by the redox-couple.

The observed stability characteristics of the photoanodes of the invention relative to the uncoated comparative photoanode are summarized in Table II.

TABLE II

| Stability Characteristics of Photoanodes | | |
|---|---|---|
| Photoanode | Thallium (III) Oxide Thickness ($\mu$m) | Halflife (hr) |
| n-type Si | 0 | $9.5 \times 10^{-3}$ |
| A | 4.6 | 26 |
| B | 0.2 | 0.1 |
| C | 0.07 | 0.70 |

Halflives of the Photoanodes A, B and C of the invention are at least 2,500, 10 and 70 times greater than that of the uncoated comparable silicon photoanode, respectively. Photoanode C, prepared by the potentiostatic anodization technique, is about seven times more stable than Photoanode B, prepared by the galvanostatic anodization technique. Also, in view of the efficiency of cell 7 in Example II, Photoanode C also produces a more efficient cell than either uncoated silicon or Photoanode B.

EXAMPLE IV

The uncoated silicon electrode and Photoelectrode B of Example I are employed in separate photoelectrosynthetic "water-splitting" cells (cells 12 13 and 14 of Table III) as photoanodes immersed in an aqueous solution of 1.0 M sodium hydroxide (NaOH) along with a platinum mesh counter electrode serving as the cathode. For a third photoelectrosynthetic water-splitting cell (cells 15 and 16 of Table III), Photoelectrode G is prepared by the potential cycling of Photoelectrode B of Example I in an alkaline solution of 1 mM potassium iridium chloride (K$_3$IrCl$_6$), depositing iridium components on at least a portion of the outer surface of the photoelectrode.

In the operation of cells 13 through 15, light having an intensity of 115 mW/cm$^2$ irradiates the photoanode resulting in the generation of oxygen therefrom, while hydrogen is generated from the counter electrode. In cells 12 and 16, light having an intensity of 15 mW/cm$^2$ irradiates the photoanode. After operation for approximately one-half hour, the observed photoelectrosynthetic cell characteristics, including efficiencies, are summarized in Table III.

Cells 14, 15 and 16, utilizing photoanodes of the invention, exhibit greater efficiencies than cells 12 and 13, employing the uncoated n-type silicon photoanode. Cell 14, employing Photoanode B, exhibits more than 300 times greater efficiency for generating hydrogen and oxygen products from water than comparable cell 13. Cells 15 and 16, employing Photoanode G, exhibit more than 2000 times greater efficiency for water splitting than comparative cells 13 and 12, respectively. Furthermore, in cell 15, the use of Photoanode G, containing the iridium promoter, increases cell efficiency by a factor of at least 7, as compared to cell 14, wherein Photoanode B contains no such irridium promoter.

While particular embodiments of the invention have been described, it will be understood, of course, that the invention is not limited thereto since many obvious modifications can be made, and it is intended to include within this invention any such modifications as will fall within the scope of the invention as defined by the appended claims.

I claim:

1. A photoelectrode comprising a conductive coating material having a band gap in the range from greater than about 0.5 to about 2.35 e.V. on a substrate containing a semiconductor material, said photoelectrode further comprising a layer of material having a bandgap greater than about 3.0 e.V. between said substrate and said coating material, and said layer having an average thickness less than about 100 angstroms.

2. The photoelectrode defined in claim 1 wherein said coating material has a resistivity less than said substrate.

3. The photoelectrode defined in claim 1 wherein said semiconductor has a band gap from about 0.5 to about 4.0 e.V.

4. The photoelectrode defined in claim 1 wherein said coating material has a resistivity less than about 10$^{-2}$ ohm-cm, measured at room temperature.

5. The photoelectrode defined in claim 1 wherein said coating material has a band gap greater than the band gap of said semiconductor material in said substrate.

6. The photoelectrode defined in claim 1 wherein said semiconductor in said substrate comprises n-type or p-type material.

7. The photoelectrode defined in claim 1 wherein said coating material is doped to degeneracy.

8. The photoelectrode defined in claim 1 wherein said layer has an average thickness from about 1 to about 20 angstroms.

9. The photoelectrode defined in claim 1 wherein said coating material is naturally degenerate.

10. The photoelectrode defined in claim 1 wherein said coating material comprises a combination of components selected from the group consisting of elements and compounds.

11. The photoelectrode defined in claim 1 wherein said coating material has a resistivity less than about $10^{-3}$ ohm-cm, measured at room temperature.

12. The photoelectrode defined in claim 1 wherein said coating material is selected from the group consisting of $Tl_2O_3$, CdO, $PbO_2$, $Cr_2O_3$, $RuS_2$, $Cu_2S$, $PtCoO_2$, $PdCoO_2$, $PdRhO_2$ and $PdCrO_2$.

13. The photoelectrode defined in claim 1 wherein said layer has a band gap greater than about 4.0 e.V.

14. The photoelectrode defined in claim 1 wherein said coating material is selected from the group consisting of thallium (III) oxide ($Tl_2O_3$) and lead dioxide ($PbO_2$).

15. The photoelectrode defined in claim 1 wherein said substrate comprises n-type silicon and said layer comprises an oxide of silicon having an average thickness less than about 50 angstroms.

16. The photoelectrode defined in claim 1 wherein said coating material is catalytic.

17. A photoelectrode comprising a coating material selected from the group consisting of $Tl_2O_3$, CdO, $PbO_2$, $Cr_2O_3$, $RuS_2$, $PtCoO_2$, $PdCoO_2$, $PdRhO_2$, and $PdCrO_2$, on a substrate containing a semiconductor.

18. The photoelectrode defined in claim 17 wherein said coating material has a band gap from about 0.5 to about 2.35 e.V.

19. The photoelectrode defined in claim 18 wherein said semiconductor has a band gap from about 0.5 to about 4.0 e.V. and is selected from the group consisting of n-type, intrinsic or p-type semiconductor material.

20. The photoelectrode defined in claim 17 wherein said coating material has a resistivity less than about $10^{-4}$ ohm-cm, measured at room temperature.

21. The photoelectrode defined in claim 17 wherein said coating material is selected from the group consisting of thallium (III) oxide ($Tl_2O_3$) and lead dioxide ($PbO_2$).

22. The photoelectrode defined in claim 17 wherein said substrate comprises n-type silicon.

23. The photoelectrode defined in claim 17 wherein said coating material is catalytic.

24. A photoelectrode comprising a coating material containing thallium (III) oxide on a substrate containing a semiconductor.

25. The photoelectrode defined in claim 24 wherein said coating material is catalytic.

26. The photoelectrode defined in claim 24 wherein said substrate is selected from the group consisting of GaAs, InP, CdSe, GaP, and Si.

27. The photoelectrode defined in claim 24 wherein said substrate comprises a material having a band gap greater than 0 and less than about 4.0 e.V.

28. The photoelectrode defined in claim 24 wherein said semiconductor has a band gap from about 0.7 to about 2.5 e.V.

29. The photoelectrode defined in claim 24 wherein said semiconductor comprises n-type silicon.

30. The photoelectrode defined in claim 29 further comprising a layer comprising silicon dioxide having an average thickness of less than about 50 angstroms and located between said n-type silicon and said thallium (III) oxide.

31. The photoelectrode defined in claim 24 wherein said thallium (III) oxide is dispersed on said substrate to an average thickness of less than $10^5$ angstroms.

32. The photoelectrode defined in claim 24 wherein said substrate has a band gap less than the band gap of said thallium (III) oxide.

33. A photoelectrode prepared by the method comprising the step of electrochemical deposition of a conductive coating material having a band gap in the range from greater than 0.5 to about 2.35 e.V. on a substrate containing semiconductor material, said photoelectrode further comprising a layer of material having a bandgap greater than about 3.0 e.V. between said substrate and said coating material, and said layer having an average thickness less than about 100 angstroms.

34. The photoelectrode prepared by the method of claim 33 wherein said electrochemical deposition comprises photoelectrochemical deposition.

35. The photoelectrode prepared by the method of claim 33 wherein said electrochemical deposition comprises potentiostatic electrochemical deposition.

36. The photoelectrode prepared by the method of claim 33 wherein said electrochemical deposition comprises electroless deposition.

37. A photoelectrochemical process employing a photoelectrode comprising a conductive coating material having a band gap in the range from greater than 0.5 to about 2.5 e.V. on a substrate containing a semiconductor material, said photoelectrode further comprising a layer of material having a bandgap greater than about 3.0 e.V. between said substrate and said coating material, and said layer having an average thickness less than about 100 angstroms.

38. The process defined in claim 37 further comprising a photoelectrochemical cell having a series resistance less than about 1000 ohms.

39. The process defined in claim 37 producing electricity in a photovoltaic cell.

40. The process defined in claim 37 producing chemical products from an endoergic reaction in a photoelectrosynthetic cell.

41. The process defined in claim 40 wherein said chemical products comprise hydrogen gas.

42. The process defined in claim 40 producing chemical products from an exoergic reaction in a photoelectrocatalytic cell.

43. The process defined in claim 42 wherein said chemical products comprise at least one organic material oxidized in said process.

44. A photoelectrochemical process employing a photoelectrode comprising a coating material containing thallium (III) oxide on a substrate containing a semiconductor.

45. The process defined in claim 44 further comprising a photoelectrochemical cell having a series resistance less than about 100 ohms.

46. The process defined in claim 44 wherein said photoelectrode further comprises an n-type silicon substrate.

47. The process defined in claim 44 producing electricity in a photovoltaic cell.

48. The process defined in claim 47 wherein said photovoltaic cell comprises a redox-couple containing ions of ferrocyanate and ferricyanate in aqueous solution.

49. The process defined in claim 44 producing hydrogen gas and oxygen gas in a photoelectrosynthetic cell.

50. The process defined in claim 44 producing propylene oxide in a photoelectrocatalytic cell.

51. A photoelectrochemical cell employing a photoelectrode comprising a conductive coating material selected from the group consisting of Tl$_2$O$_3$, CdO, PbO$_2$, Cr$_2$O$_3$, RuS$_2$, PtCoO$_2$, PdCoO$_2$, PdRhO$_2$, and PdCrO$_2$, on a substrate containing a semiconductor material.

52. The cell defined in claim 51 comprising a photovoltaic cell.

53. The cell defined in claim 51 comprising a photoelectrosynthetic cell.

54. The cell defined in claim 51 comprising a photoelectrocatalytic cell.

55. The cell defined in claim 51 having a series resistance less than about 100 ohms.

56. The cell defined in claim 51 producing chemical products selected from the group consisting of hydrogen, oxygen, chlorine, bromine, iodine and propylene oxide.

57. A photoelectrochemical cell employing a photoelectrode comprising a coating material containing thallium (III) oxide on a substrate containing a semiconductor.

58. The cell defined in claim 57 comprising a photovoltaic cell.

59. The cell defined in claim 57 comprising a photoelectrosynthetic cell.

60. The cell defined in claim 57 comprising a photoelectrocatalytic cell.

61. The cell defined in claim 57 having a series resistance less than about 100 ohms.

62. The cell defined in claim 57 producing chemical products selected from the group consisting of hydrogen, oxygen, chlorine, bromine, iodine and propylene oxide.

63. The cell defined in claim 57 further comprising a redox-couple containing ions of ferrocyanide and ferricyanide in a liquid.

* * * * *